US006585884B1

(12) United States Patent
Mayes, Jr.

(10) Patent No.: US 6,585,884 B1
(45) Date of Patent: *Jul. 1, 2003

(54) METHOD OF PRODUCING SYNTHESIS GAS FROM A REGENERATION OF SPENT CRACKING CATALYST

(76) Inventor: Warden W. Mayes, Jr., 9945 Tanglevine Dr., Dallas, TX (US) 75238

(*) Notice: Subject to any disclaimer, the term of this patent is extended or adjusted under 35 U.S.C. 154(b) by 0 days.

This patent is subject to a terminal disclaimer.

(21) Appl. No.: 10/272,709

(22) Filed: Oct. 17, 2002

Related U.S. Application Data

(63) Continuation-in-part of application No. 09/704,085, filed on Nov. 1, 2000, now Pat. No. 6,491,810.

(51) Int. Cl.[7] .................... B01J 38/20; B01J 38/40; C01B 3/02; C01B 31/18; C10G 11/00
(52) U.S. Cl. .................... 208/113; 252/373; 423/418.2; 423/437.1; 502/38; 502/39; 502/49
(58) Field of Search .................. 208/113; 252/373; 502/38, 39, 49; 423/418.2, 437.1

(56) References Cited

U.S. PATENT DOCUMENTS 4,849,092 A * 7/1989 Ham et al. .................... 502/49
5,009,769 A * 4/1991 Goelzer ........................ 208/113
5,073,529 A * 12/1991 Miller et al. ................... 502/49
5,814,208 A * 9/1998 Menon et al. ................. 208/113
6,491,810 B1 * 12/2002 Mayes, Jr. .................... 208/113

* cited by examiner

Primary Examiner—Wayne A. Langel
(74) Attorney, Agent, or Firm—Hitt Gaines & Boisbrun, PC

(57) ABSTRACT

The present invention provides a method of producing a synthesis gas from a regeneration of spent cracking catalyst. The method includes introducing a spent cracking catalyst into a first regeneration zone in a presence of a first oxygen and carbon dioxide atmosphere and at a first regeneration temperature. For example, a temperature that does not exceed about 1400° F., and more preferable a temperature that ranges from about 1150° F. to about 1400° F., may be used as the first regeneration temperature. The method further includes introducing the spent cracking catalyst from the first regeneration zone into a second regeneration zone in a presence of a second oxygen and carbon dioxide atmosphere, and producing a synthesis gas from cracking deposits located on the spent cracking catalyst within the second regeneration zone at a second regeneration temperature substantially greater than said first regeneration temperature. In a preferred embodiment, the second regeneration temperature ranges from about 1500° F. to about 1800°, and in a related embodiment is about 1800° F.

25 Claims, 1 Drawing Sheet

METHOD OF PRODUCING SYNTHESIS GAS FROM A REGENERATION OF SPENT CRACKING CATALYST

CROSS-REFERENCE TO RELATED APPLICATIONS

This application is a continuation-in-part of U.S. patent application Ser. No. 09/704,085, entitled "METHOD OF PRODUCING SYNTHESIS GAS FROM A REGENERATION OF SPSENT CRACKING CATALYST", filed on Nov. 1, 2000, U.S. Pat. No. 6,491,810. The above-listed application is commonly assigned with the present invention and is incorporated herein by reference as if reproduced herein in its entirety.

TECHNICAL FIELD OF THE INVENTION

The present invention is directed, in general, to a method of using a catalytic cracker and, more specifically, to a method of producing synthesis gas from a regeneration of spent cracking catalyst.

BACKGROUND OF THE INVENTION

Catalytic cracking processes have been developed principally for upgrading feedstock derived from natural or synthetic crude oil to more valuable hydrocarbon mixtures, particularly of lower molecular weight. These lower molecular weight hydrocarbons are generally more desirable because of their higher quality and market value. In a typical catalytic cracking process, a crude oil derived feedstock is contacted with a hot, regenerated catalyst, at temperatures ranging from about 1200° F. to about 1400° F. and low to moderate pressures. The chemical reactions that take place in the presence of the catalyst include predominantly scission of carbon-to-carbon bonds (simply cracking), isomerization, polymerization, dehydrogenation, hydrogen transfer, and others, generally leading to lower molecular weight hydrocarbon products.

Some of the cracking reactions in the catalytic cracker also produce hydrocarbonaceous compounds of high molecular weight, of very low volatility, of very high carbon content and of low combined hydrogen content. The hydrocarbonaceous compounds tend to be deposited on the active surfaces of the cracking catalyst and mask the active sites, rendering the catalyst less active, thus unsuitable for continued cracking without regeneration. Deposits of the hydrocarbonaceous matter and the inclusion of absorbed and adsorbed hydrocarbons, as well as the vaporous combustible components in the fluidizing media between the solid catalyst particles, collectively called "coke," are in a sense undesirable. In response to the undesirable buildup of coke on the surfaces of the catalyst, the oil and gas industry has developed several techniques to reduce, or remove, such buildups.

One technique currently used to reduce the coke forming characteristics of feedstocks, includes without limitation, hydrotreatment, distillation, or extraction of the natural or synthetic crude feedstock prior to charging it to the catalytic cracker. Hydrotreatment, distillation, or extraction of the crude oil derived feedstock serves to remove a substantial amount of the coke precursors, such as contained in asphaltenes, polynuclear aromatics, etc., prior to catalytic cracking. Hydrotreatment, distillation, or extraction are somewhat effective in reducing or removing large amounts of coke precursors from the crude oil derived feedstock, however, such processes are expensive and time-consuming processes. Currently, incrementally available crude oil is of high residuum content and of higher coke forming characteristics at a time when it is unpopular or unlawful to utilize this additional residuum as fuel oil. At the same time, the market for residuum products, other than as fuel oil, is saturated. Additionally, to upgrade the residuum materials by the available technology results in products of lower quality (and lower market value) than would be achieved by catalytic cracking, provided the coke yield can be handled. Moreover, current and anticipated Federal and State Legislation has, and is, scrutinizing the environmental and storage issues associated with use, removal or conversion of the coke precursors. Therefore, there is a great need for an environmentally responsible conversion of the residuum portion of crude oil.

Another technique currently used to remove coke formation from the spent cracking catalyst is to burn the coke away from the catalyst surface using an oxygen-containing gas stream in a separate regeneration reactor. In such a situation, air, oxygen, carbon dioxide, and steam for diluent as combustion gas, may be introduced into the spent cracking catalyst in the lower portion of the regeneration zone(s), while cyclones are provided in the upper portion of the regeneration zone for separating the combustion gas from the entrained catalyst particles. The coke buildup removal process attempts to substantially remove the coke buildup, and is generally effective, but large amounts of greenhouse gases are produced, at least some of which are released into the atmosphere, which is generally environmentally undesirable. Another technique teaches the use of a waste heat boiler as a means of reducing greenhouse gasses from going to the atmosphere, however, the reduction by this method remains limited to the achievable concentration of a fired heater. U.S. Pat. No. 4,388,218 entitled "Regeneration of Cracking Catalyst in Two Successive Zones" to Rowe, and U.S. Pat. No. 4,331,533 entitled "Method and Apparatus for Cracking Residual Oils" to Dean et al., further detail such processes and are included herein by reference.

Similarly, the regeneration zone must be carried out in such a way that it is in thermal equilibrium with the cracking reaction zone. In other words, the sensible heat of the hot regenerated catalyst in the catalytic cracker should be in balance with the heat requirements of the catalytic cracking reactor zone. In conventional operations, excluding the use of internal or external cooling coils for removing heat from the regenerator reaction zone, coke yield of only about 5 to about 8 weight percent of the total feed may be burned from the catalyst, without exceeding the amount of heat required to balance and sustain the cracking reaction.

Thus, to maintain the thermal balance needed to operate the catalytic cracker and remove enough of the coke from the catalyst to sustain the cracking process, one of two things should be done. First, the amount of coke that forms on the surface of the catalyst should be reduced. However, as mentioned above, this can typically be accomplished by using higher quality feedstock, which is more costly, or subjecting the currently available feedstock to the previously mentioned upgrading, such as but not limited to, hydrotreatment, distillation or extraction processes, which are also more costly. Second, internal or external cooling units could be installed in the regeneration units. However, such internal or external cooling units are costly and unreliable.

Accordingly, what is needed in the art is a method of catalytically cracking crude oil derived feedstock having high coke forming characteristics, without experiencing the drawbacks of the prior art methods.

SUMMARY OF THE INVENTION

To address the above-discussed problems of the prior art, the present invention provides a method of producing a synthesis gas from a regeneration of a spent cracking catalyst. The method includes introducing a spent cracking catalyst into a first regeneration zone in a presence of a first oxygen and carbon dioxide atmosphere and at a first regeneration temperature. For example, a temperature that does not exceed about 1400° F., and more preferable, a temperature that ranges from about 1150° F. to about 1400° F., may be used as the first regeneration temperature. The method further includes introducing the spent cracking catalyst from the first regeneration zone into a second regeneration zone. The spent cracking catalyst is introduced into the second regeneration zone in a presence of a second oxygen and carbon dioxide atmosphere, and at a second regeneration temperature substantially greater than the first regeneration temperature. A synthesis gas may then be formed from oxidation of the carbon on the coke located on the spent cracking catalyst within the second regeneration zone. The method further includes introducing the spent cracking catalyst from the second regeneration zone into a third regeneration zone in a presence of a third oxygen and carbon dioxide atmosphere, wherein the third regeneration zone is operated at a temperature of greater than about 1400° F. and maintained in an oxidation mode to restore the full potential of the cracking catalyst activity prior to its reuse in the cracking reaction zone, and to produce enough carbon dioxide to support the first, second or third, or any combination thereof, oxygen and carbon dioxide atmospheres.

In contrast to the prior art catalytic cracking method, the above-mentioned method is capable of producing commercial amounts of synthesis gas, which may then be commercially used or sold. Moreover, the above-mentioned method is capable of accepting feedstock having high coke forming characteristics, which in one advantageous embodiment, may be accepted without hydrotreating, separating as a distillation overhead product, or solvent extracting as an extract product the feedstock prior to catalytic cracking. Both the ability to accept, and the ability to accept without the need for hydrotreating, distillation, or solvent extraction, provide both economical and environmental benefits not achieved in the prior art methods.

In another aspect of the invention, the synthesis gas comprises carbon monoxide. Where the amount of synthesis gas produced is inadequate to meet the market needs or the intended system consumption capacity, in an alternative aspect, a supplemental fuel, such as a hydrocarbonaceous material, may be introduced into the spent catalyst flow path through the regeneration zones. Preferably this is added at or near the entrance to the first regeneration zone, in order that the combined hydrogen content will be reduced in the first regeneration zone, thus subsequent regeneration zones will have reduced water formation therein. The supplemental fuel is preferably one of low hydrogen content and is preferably introduced into the first regeneration zone. At least a portion of the first oxygen and carbon dioxide atmosphere, the second oxygen and carbon dioxide atmosphere, and the third oxygen and carbon dioxide atmosphere, may in another aspect, be preheated to a temperature substantially equal to the first regeneration temperature, the second regeneration temperature, and the third regeneration temperature, respectively.

In an alternative embodiment, a carbon dioxide by-product of the first regeneration zone may be used at least as a portion of the second oxygen and carbon dioxide atmosphere. Likewise, in another embodiment, the second oxygen and carbon dioxide atmosphere is substantially water-free. For example, in an alternative embodiment, the second oxygen and carbon dioxide atmosphere has a water content ranging from about 1 to about 10 mole percent.

A catalytic cracking process is provided in another aspect of the invention. The process includes (1) introducing a feedstock and a catalyst into a catalytic cracker, (2) cracking the feedstock into a cracked product and coke, the coke forming a deposit on a spent cracking catalyst, (3) regenerating the spent cracking catalyst obtained from the catalytic cracker as outlined above, and (4) recycling a regenerated catalyst to the catalytic cracker. In an alternative aspect, the feedstock is unseparated feedstock containing asphalt or pitch. However, in another aspect, the feedstock is a preheated feedstock.

In still another aspect of the present invention, the formation of synthesis gas is maximized by (1) utilizing a preheated oxygen and carbon dioxide atmosphere in any of the first, second, or third regeneration zones, (2) avoiding the use of cooling coils in any of the first, second or third regeneration zones, therefore oxidizing, in the first reaction zone, only enough coke and supplemental fuel to oxidize the hydrogen content of the coke and the supplemental fuel to reduce the water content in the second regeneration zone so as to avoid exceeding the operating conditions which result in destroying the cracking catalyst. Such conditions are a function of the second and third regeneration zone's temperatures and flue gas water content.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
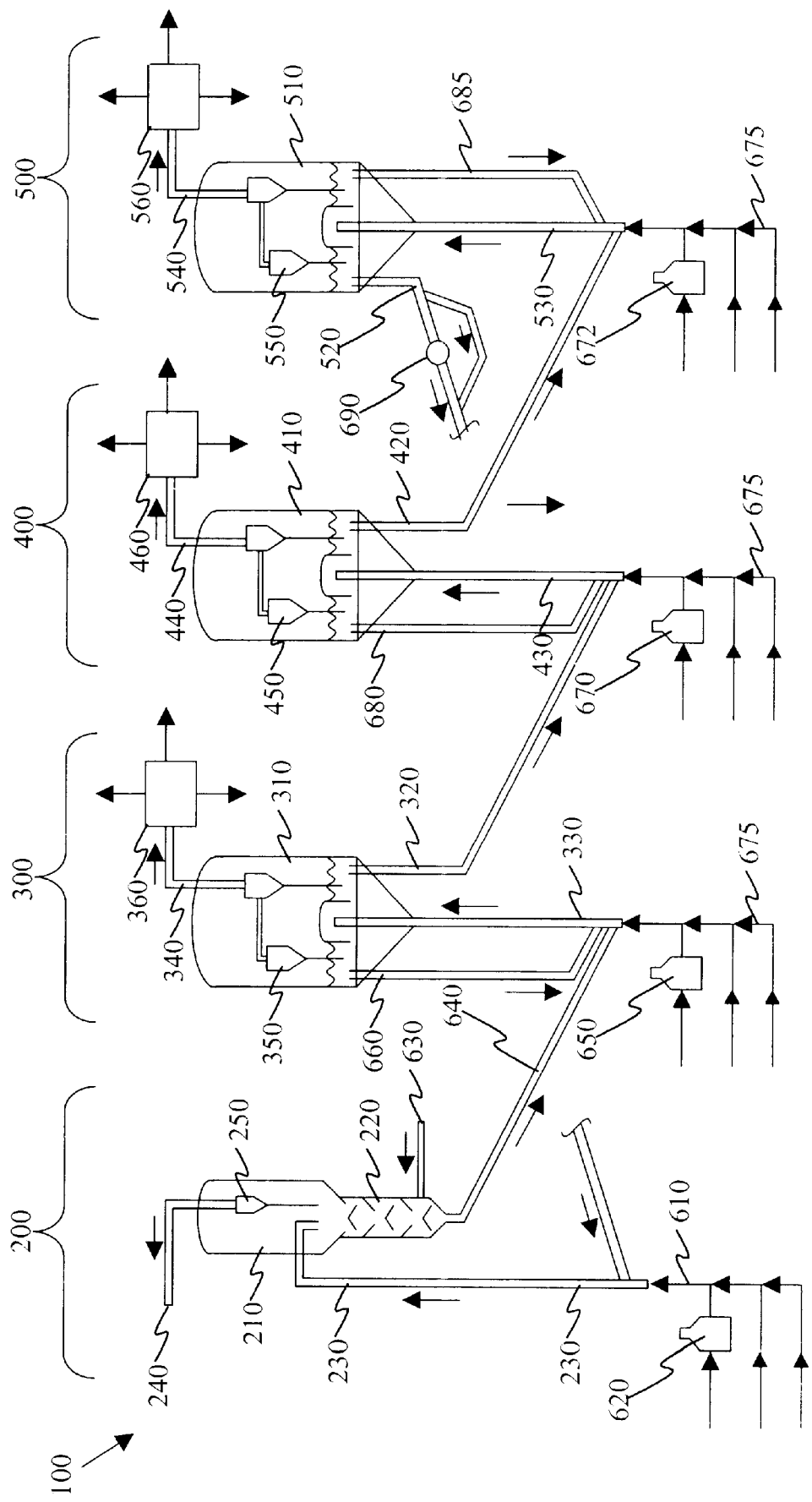
FIG. 1 illustrates one embodiment of a catalytic cracking system wherein the inventive method may be practiced.

Referring initially to FIG. 1, illustrated is a schematic diagram of an exemplary configuration of a catalytic cracking system 100. In the illustrative embodiment shown in FIG. 1, the catalytic cracking system 100 includes a catalytic cracking reaction zone 200, a first regeneration zone 300, a second regeneration zone 400, and a third regeneration zone 500. Those skilled in the art will understand that the first regeneration zone 300, the second regeneration zone 400, or the third regeneration zone 500 may include a contact system other than the dilute phase (entrained) flow section as shown in FIG. 1, there being other regeneration zone designs suitable for use with the disclosed invention. Likewise, those skilled in the art will also understand that the present invention is not limited to a single cracking reaction zone 200 and three regeneration zones 300, 400, 500. Multiple cracking reaction zones and regeneration zones are within the scope of the present invention. It should also be noted that valves, flanges, fittings, and some associated pumps, exchangers, and instruments may not be shown in FIG. 1 for simplicity reasons.

In the illustrative embodiment shown in FIG. 1, the catalytic cracking reaction zone 200 includes a cracker reactor disengaging space 210, a spent catalyst steam stripper 220, a dilute phase cracking reactor transport line 230 and a cracked product exit line 240. The catalytic cracking reaction zone 200 may also, in an exemplary embodiment, include cyclones 250. In the embodiment illustrated in FIG. 1 the cyclones 250 are shown as a single cyclone, however, it should be noted that there may be more than one cyclone in parallel, or even groups of cyclones in series or in series and in parallel. It should be noted that the cyclones for the catalytic cracking reaction zone 200, the first regeneration zone 300, the second regeneration zone 400, or the third regeneration zone 500, are shown as internal cyclones, but may be externally mounted without changing the teaching of this disclosed invention. The catalytic cracking reaction zone 200 in the embodiment shown in FIG. 1 is a dilute phase fluid bed catalytic cracker, but those skilled in the art understand that the fluid bed catalytic cracker may be replaced with a moving bed catalytic cracker, falling bed catalytic cracker, fixed bed catalytic cracker, or any other known or hereafter discovered catalytic cracker, without departing from the scope of the present invention.

In the illustrative embodiment shown in FIG. 1, the first regeneration zone 300 includes a first disengaging space 310, a partially regenerated catalyst line 320, a first regenerator dilute phase transport line 330 and a first regeneration zone flue gas line 340. Similar to the catalytic cracking reaction zone 200, the first regeneration zone 300 may, in a preferred embodiment, include cyclones 350. In the embodiment shown in FIG. 1, two cyclones 350 are shown in series, however, it should be noted that one or more cyclones, internal, external or a mixture or such, in series, parallel, or both, are also within the scope of the present invention. The first regeneration zone 300 may also include a first regeneration zone treating or separation system 360. Any one or combination of known treating or separation processes may be used, for example without limitation, removal of water, sulfur oxide ($SO_x$), nitrogen oxide ($NO_x$) and carbon monoxide (CO).

In the illustrative embodiment shown in FIG. 1, the second regeneration zone 400 includes a second disengaging space 410, a second partially regenerated catalyst line 420, a second regenerator dilute phase transport line 430 and a second regeneration zone flue gas line 440. Similar to the catalytic cracking reaction zone 200, the second regeneration zone 400 may, in a preferred embodiment, include cyclones 450. In the embodiment shown in FIG. 1, two cyclones 450 are shown in series, however, it should be noted that one or more cyclones, internal, external or a mixture or such, in series, parallel, or both, are also within the scope of the present invention. The second regeneration zone 400 may also include a second regeneration zone treating or separation system 460, wherein the second regeneration zone treating or separation system 460 is similar to the first regeneration zone treating or separation system 360.

As is further illustrated in FIG. 1, the third regeneration zone 500 includes a third disengaging space 510, a regenerated catalyst line 520, a third regenerator dilute phase transport line 530, and a third regeneration zone flue gas line 540. Similar to the catalytic cracking reaction zone 200, the third regeneration zone 500 may, in a preferred embodiment, includes cyclones 550. In the embodiment shown in FIG. 1 two cyclones 550 are shown in series, however, it should be noted that one or more cyclones, either internal, external or a mixture or such, in series, in parallel, or both, are within the scope of the present invention. The third regeneration zone 500 may also include a third regeneration zone treating or separation system 560. Those skilled in the art will realize that other types of catalytic cracking system 100 designs may satisfy the requirements of the present invention without changing the teachings disclosed herein, including using multiple reaction zones, instead of the first, second and third regeneration zones 300, 400, 500 illustrated in FIG. 1.

It has been found that typical oxidizing reactions proceed more rapidly at higher temperatures. However, it has also been found that each individual oxidizing reaction rate disproportionately changes with temperature. To understand such a process, the following oxidizing reactions have been provided:

$$C + \tfrac{1}{2} O_2 = CO; \tag{1}$$

$$C + O_2 = CO_2; \tag{2}$$

$$C + CO_2 = 2CO; \tag{3}$$

$$C + H_2O = CO + H_2; \tag{4}$$

and $$C + 2H_2O = CO_2 + 2H_2. \tag{5}$$

It has been found that the reaction rate (change in a reactants concentration as a function of time) for reaction 1 increases more rapidly with increased temperature than does reaction 2. At temperatures below 1400° F. the equilibrium molal ratio of $CO/CO_2$ is well below unity, where at temperatures near 1800° F. the $CO/CO_2$ molal ratio is much greater. By limiting oxygen input such that there is little or no excess oxygen at temperatures ranging between the cracking reactor temperature and about 1400° F. the formation of $CO_2$ is favored. At temperatures between about 1400° F. and about 1800° F. the formation of CO is favored and the oxidization is rapid.

It has also been found, that even the most thermally stable cracking catalyst commercially used is stable up to a temperature of about 1400° F. in the presence of the water vapor content normally experienced in regenerating said cracking catalyst. Furthermore, it has been found that such commercially used cracking catalyst may be subjected to temperatures up to about 1800° F. in contact with oxidizing gas (flue gas) of decreased water content, the allowable water content being somewhat inversely proportional to temperature.

It is further known that the reaction rate of reaction 3 is almost nonexistent at or below temperatures of about 1400° F., but becomes significant between about 1400° F. and about 1800° F. From these facts, it has been found that the most favorable method of regenerating cracking catalyst to produce carbon monoxide (CO) is to first oxidize only enough of the coke as to reduce the concentration of combined hydrogen in the coke, the hydrogen compounds being more rapidly oxidized than virtually all the carbon compounds, especially the elemental hydrogen or low molecular weight fuel, such as but not limited to methane. After having reduced the combined hydrogen content of the coke in the first regeneration zone 300, the remainder of the carbon of the coke in a second regeneration zone 400 and a third regeneration zone 500, may be oxidized at a higher temperature without damage to the catalyst.

The discussion will now turn to specific details of a method of using the catalytic cracking system 100, or another similar system, to produce a commercial amount of a synthesis gas while regenerating a spent cracking catalyst. Initially a feedstock 610 is supplied to a lower portion of the dilute phase cracking reactor transport line 230 where it is combined with regenerated catalyst provided from the regenerated catalyst line 520. The feedstock 610, in an exemplary embodiment, comprises a fresh feed stream combined with a recycled hydrocarbon stream and a specified amount of steam. Moreover, prior to entering the lower portion of the dilute phase cracking reactor transport line 230, the feedstock 610 may be preheated in a furnace 620. The furnace 620 may provide for a controlled increase in the temperature of the feedstock 610, or vaporization of at least a part thereof, which may facilitate the reaction between the feedstock 610 and the regenerated catalyst provided from the regenerated catalyst line 520. It should be noted, and is well understood by one skilled in the art, that the feedstock 610 flowing through the furnace 620 for preheating, may include at least portions of recycled hydrocarbon stream and steam through piping not shown, and that the feedstock 610 could include other similar materials. In one particularly advantageous embodiment, the fresh feed stream comprises a high coke forming feedstock, such as an unseparated feedstock containing high amounts of asphalt and pitch. As previously mentioned, the feedstock may be preheated in the furnace 620, however, in an alternative embodiment, the feedstock 610 may be bypassed around the furnace 620, using lines not shown herein.

After entering the lower portion of the dilute phase cracking reactor transport line 230 and combining with the regenerated catalyst from the regenerated catalyst line 520, the hydrocarbons react to form reactants, and the mixture rises to the upper portion of the dilute phase cracking reactor transport line 230. The mixture may then discharge from the upper portion of the dilute phase cracking reactor transport line 230 into the cracking reactor disengaging space 210, where cracking reactions continue. As is understood by one skilled in the art, the cracking process produces vaporous cracked material and spends cracking catalyst by depositing coke thereon. Once within the cracking reactor disengaging space 210, vaporous cracked material rises to the upper portion of the cracking reactor disengaging space 210. In a preferred embodiment, the vaporous cracked material rises to the upper portion of the cracking reactor disengaging space 210 and enters one or a plurality of the cyclones 250. The cyclones 250 tend to separate the vaporous cracked material from any remaining spent catalyst suspended therein. The vaporous cracked material may then rise and exit through the cracked product exit line 240 and then flow to separation equipment (not shown). The spent catalyst removed by the cyclones 250 may then flow downwardly and discharge from a dip leg of the cyclones 250.

The spent catalyst may then flow from the lower portion of the cracking reactor disengaging space 210 to the spent catalyst steam stripper 220. In the illustrative example shown in FIG. 1, the spent catalyst flows downwardly as steam countercurrently flows upwardly. The steam may be provided using a steam input line 630, and alternatively may be superheated, up to a temperature of about 1400° F., prior to entering the steam stripper 220. Depending on the design of the catalytic cracking system 100, the upward flowing steam may flow from the steam stripper 220 to the lower portion of the cracker reactor disengaging space 210, or the upward flowing steam may alternatively be withdrawn using a steam seal, piping and valve that is not shown.

Spent and steam stripped, the spent cracking catalyst may flow from the catalyst cracking reaction zone 200, through a carrier line 640, to the first regeneration zone 300. In a more specific example, the spent cracking catalyst may enter the lower portion of the first regenerator dilute phase transport line 330. At the lower portion of the first regenerator dilute phase transport line 330, the spent cracking catalyst may be introduced to a first oxygen and carbon dioxide atmosphere. In a preferred embodiment, the first oxygen and carbon dioxide atmosphere comprises a first combustion gas. As used herein, oxygen includes commercially available pure, or internally produced pure oxygen. As also used herein, the carbon dioxide atmosphere includes a carbon dioxide rich atmosphere. Preferably, the carbon dioxide rich atmosphere comprises in excess of about 50 mole percent carbon dioxide, and even more preferably, in excess of about 75 mole percent carbon dioxide. It should be noted, however, that the present invention is not limited to such percentages.

In a preferred embodiment, the first oxygen and carbon dioxide atmosphere or the carbon dioxide portion of the atmosphere, may be preheated in a furnace 650 prior to combining with the spent cracking catalyst. In another preferred embodiment, the furnace 650 preheats the first oxygen and carbon dioxide atmosphere to a temperature substantially equal to the operating temperature of the first regeneration zone 300. The components of the first oxygen and carbon dioxide atmosphere are shown in FIG. 1 as flowing into a common line prior to entering the lower portion of the first regenerator dilute phase transport line 330, however, the skilled artisan will understand that any one or any portion of these flows may be introduced through furnace 650 separately or in combination.

The amount of the first oxygen and carbon dioxide atmosphere may vary, however, the amount of each gas component should be adjusted so as to oxidize a minimal portion of the net coke, but to reduce the hydrogen content of the coke on the surface of the spent cracking catalyst leaving the first regeneration zone 300. In one advantageous embodiment, the amount of each gas component should be controlled to achieve a first regeneration zone 300 temperature not to exceed about 1400° F., and more precisely, a first regeneration zone 300 temperature ranging from about 1150° F. to about 1400° F. Cracking temperatures above about 1400° F., in the presence of anticipated water concentration, like provided in the first regeneration zone 300, are generally undesirable since they tend to cause damage to the cracking catalyst.

The spent cracking catalyst and the first oxygen and carbon dioxide atmosphere flow upwardly within the first regenerator dilute phase transport line 330 to the first disengaging space 310 for separation of vaporous reactants from the spent catalyst. Partially regenerated catalyst flowing from the upper portion of the first regenerator dilute phase transport line 330 tends to fall into the lower portion of the first disengaging space 310 to form a fluid bed. While located within the fluid bed, additional oxidation of the coke from the partially regenerated catalyst may occur. To facilitate the additional oxidation within the fluid bed, in an exemplary embodiment, additional amounts of oxygen and carbon dioxide atmosphere may be introduced within the fluid bed. For example, the additional amounts of oxygen and carbon dioxide atmosphere may be introduced within the fluid bed through a distribution grid or piping coil.

The vaporous reactants of the first regeneration zone 300 tend to rise within the first disengaging space 310 and enter cyclones 350. The cyclones 350, similar to the cyclones 250 found within the catalytic cracking reaction zone 200, may separate suspended spent catalyst from the vaporous reactant's flue gas. Spent catalyst removed from the vaporous flue gas flows downwardly through the dip leg to the fluid bed, as the vaporous flue gas exits the first regeneration zone 300 through the first regeneration zone residue gas line 340. In one advantageous embodiment, the vaporous flue gas then enters the first regeneration zone treating or separation system 360. The vaporous flue gas may be given treatment or separation utilizing any one or more of several types of well-known treatments. Such treatments or separation may separate the vaporous flue gas into its constituent components consistent with its intended use. At temperatures ranging from about 1150° F. to about 1400° F., the most rapid components to oxidize are those which contain hydrogen content, sulfur content and nitrogen content, however, carbon dioxide content, carbon monoxide content and other pollutants are also present in the flue gas. In one particularly advantageous embodiment, the carbon dioxide flue gas by-product of the first regeneration zone 300 may provide the carbon dioxide needed in the first regeneration zone 300.

A portion of the hot partially regenerated spent catalyst located within the fluid bed may be recycled through a line 660 to the lower portion of the first regenerator dilute phase transport line 330. This may be used to accelerate the initial oxidizing reaction rate in the first regenerator dilute phase transport line 330. However, the net circulation portion of the partially regenerated spent catalyst travels through a partially regenerated catalyst line 320 to the second regeneration zone 400. In a preferred embodiment, the remaining portion of the partially regenerated spent catalyst travels through the partially regenerated catalyst line 320 to a lower portion of the second regenerator dilute phase transport line 430.

At the lower portion of the second regenerator dilute phase transport line 430, the partially regenerated spent cracking catalyst from the first catalyst transport line 320 is introduced to a second oxygen and carbon dioxide atmosphere. In a preferred embodiment, the second oxygen and carbon dioxide atmosphere comprises a combustion gas. The partially regenerated spent cracking catalyst and the second oxygen and carbon dioxide atmosphere, in an exemplary embodiment, are substantially waterfree. For example, in another exemplary embodiment, flue gas from the regeneration of the partially regenerated spent cracking catalyst along with the second oxygen and carbon dioxide atmosphere, have a water content ranging from about 1 to about 10 mole percent.

In one particularly advantageous embodiment, the carbon dioxide flue gas by-product of the first regeneration zone 300 may provide at least a portion of the carbon dioxide needed in the second regeneration zone 400. In a preferred embodiment, the second oxygen and carbon dioxide atmosphere, or strictly the carbon dioxide portion of the atmosphere, may be preheated in a furnace 670 prior to combining with the oxygen and the spent cracking catalyst. Similar to the furnace 650, the furnace 670 may preheat the second oxygen and carbon dioxide atmosphere, or strictly the carbon dioxide portion of the atmosphere, to a temperature substantially equal to the operating temperature of the second regeneration zone 400. Those skilled in the art will also realize that the preheating of the second oxygen and carbon dioxide atmosphere, or strictly the carbon dioxide portion of the atmosphere, may also be accomplished by heat exchange with a hot process stream. The hot process stream, in an exemplary embodiment, could include the first regeneration zone flue gas line 340 or the second regeneration zone flue gas line 440. The second oxygen and carbon dioxide atmosphere is preferably preheated, because it has been found that the carbon dioxide will begin to react with the carbon of the coke endothermically to form more carbon monoxide at a decreasing temperature, thus limiting the second reactor temperature in the second regeneration zone 400. The components of the second oxygen and carbon dioxide atmosphere are shown in FIG. 1 as flowing into a common line prior to entering the lower portion of the second regenerator dilute phase transport line 430, however the skilled artisan will understand that any one or a portion of these flows may be introduced separately or in combination.

The flow rate of each component of the second oxygen and carbon dioxide atmosphere introduced to the second regeneration zone may vary, however, the flow rate of each component should be adjusted independently so as to oxidize a substantial portion of the remaining net coke production, yet operate in a partial oxidizing mode. In one advantageous embodiment, the amount of each component should be controlled individually to achieve a second regeneration zone 400 temperature substantially greater than the first regeneration zone 300 temperature, and to achieve optimum conversion of the coke and supplemental fuel to carbon monoxide. For example, the second regeneration zone 400 temperature should be greater than the maximum of 1400° F. used in the first regeneration zone 300. In an exemplary embodiment, the second regeneration zone 400 temperature may range from about 1500° F. to about 1800° F. Since the water forming hydrogen content of the coke was substantially reduced in the first regeneration zone 300, the partially regenerated spent cracking catalyst can handle temperatures up to about 1800° F. without damage, which is contrary to the first regeneration zone 300, and contrary to the prior art carbon monoxide (synthesis gas) forming regenerators. Generally, the heat generated in the second reaction zone 400 is desirable for the reaction and should remain therein. For example, in a preferred embodiment, the first and second regeneration zones 300, 400, respectively, should not have a significant amount of heat removed, because to do so could suppress the endothermic reaction of carbon dioxide with carbon, to form additional carbon monoxide and reduce the cost of oxygen requirements. Thus, those skilled in the art now understand the use of carbon dioxide to minimize the costly oxygen requirement and to maximize the production of carbon monoxide.

The partially regenerated spent cracking catalyst and the second oxygen and carbon dioxide atmosphere flow upwardly within the second regenerator dilute phase transport line 430 to the second disengaging space 410 for separation of a substantial portion of the remaining coke from the partially regenerated spent catalyst. Partially regenerated catalyst flowing from the upper portion of the second regenerator dilute phase transport line 430 tends to fall into the lower portion of the second disengaging space 410 to form a fluid bed. While located within the fluid bed, additional oxidation of the coke from the partially regenerated catalyst may occur. To facilitate the additional oxidation within the fluid bed, in an exemplary embodiment, additional carbon dioxide and oxygen may be introduced within the fluid bed. For example, the additional carbon dioxide and oxygen atmosphere may be introduced within the fluid bed at a point below a distribution grid or piping coil.

The vaporous reactants of the second regeneration zone 400 tend to rise within the second disengaging space 410 and enter the cyclones 450. The cyclones 450, similar to the cyclones 250 found within the catalytic cracking reaction zone 200, may separate suspended spent catalyst from the vaporous flue gas. Spent catalyst removed from the vaporous flue gas may then flow downwardly through the dip leg to the fluid bed, as the vaporous flue gas exits the second regeneration zone 400 through the second regeneration flue gas line 440. The vaporous flue gas may then enter the second regeneration zone treating or separation system 460. The vaporous flue gas may be given treatment or separation utilizing any one or more of several types of well-known treatments or separations. Such treatments may separate the vaporous flue gas into its constituent components. In contrast to the first regeneration zone 300 where larger amounts of carbon dioxide are formed, the second regeneration zone 400 produces larger amounts of synthesis gas, such as carbon monoxide. This is a result of the higher temperatures used in the second regeneration zone 400 favoring the formation of carbon monoxide rather than carbon dioxide. Other minor constituents produced by the treatment of the vaporous flue gas include water, sulfur compounds, nitrogen compounds, carbon dioxide and particulate matter. It should be pointed out, in contrast to the prior art systems, that it has been found that the use of cooling coils within any of the first, second or third regeneration zones 300, 400, 500, simply reduces the efficiency of the first, second or third regeneration zones 300, 400, 500, to maximize the production of carbon monoxide. For such a reason, it is preferred that cooling coils not be used within any of the first, second or third regeneration zones 300, 400, 500.

In one particularly advantageous embodiment, high enough amounts of carbon monoxide are produced from the coke and alternatively supplemental fuels, if any, to fuel or feed other systems within the petrochemical plant, or be sold to an external enterprise. Regardless, using the above-mentioned process has turned what was historically considered waste into a valuable and profitable resource.

In situations where the operator of the catalytic cracking system 100 has entered into an agreement with an external enterprise to provide a specified amount of carbon monoxide, and the coke forming characteristics of the feedstock are not great enough to provide the agreed upon quantity of carbon monoxide or hydrogen gas, supplemental fuel 675 may be included with the first, second or third oxygen and carbon dioxide atmospheres, or added separately. Where the amount of synthesis gas produced is inadequate to meet the market needs or the intended system consumption capacity, in an alternative aspect, a supplemental fuel, such as a hydrocarbonaceous material, may be introduced into the spent catalyst flow path through the regeneration zones. Preferably this is added at or near the entrance to the first regeneration zone, in order that the combined hydrogen content will be reduced in the first regeneration zone, thus subsequent regeneration zones will have reduced water formation therein. The supplemental fuel is preferably one of low hydrogen content and is preferably introduced into the first regeneration zone. Inclusion of the supplemental fuel 675 helps to increase the output of the carbon monoxide. For instance, a specified amount of a carbon-based material highly deficient in hydrogen could be supplemented with the first or second oxygen and carbon dioxide atmosphere, or added separately. Such carbon-based materials may include carbon derived from coal, pitch, and many others. Furthermore, it is preferred to use a high carbon-based material having low concentrations of hydrogen, ash, and sulfur.

Once the vaporous flue gas has been separated from the substantially regenerated catalyst, a portion of the hot substantially regenerated catalyst located within the fluid bed may be recycled through a line 680 to the lower portion of the second regenerator cracking reactor dilute phase transport line 430, to increase the initial temperature therein. However, the remaining portion of the partially regenerated spent catalyst travels through a second partially regenerated catalyst line 420 to the third regeneration zone 500. In a preferred embodiment, the remaining portion of the partially regenerated spent catalyst travels through the second partially regenerated catalyst line 420 to a lower portion of the third regenerator dilute phase transport line 530.

At the lower portion of the third regenerator dilute phase transport line 530, the partially regenerated spent cracking catalyst from the second catalyst transport line 420 is introduced to a third oxygen and carbon dioxide atmosphere. In a preferred embodiment, the third oxygen and carbon dioxide atmosphere comprises a combustion gas. The partially regenerated spent cracking catalyst and the third oxygen and carbon dioxide atmosphere, in an exemplary embodiment, are once again substantially water-free. For example, in another exemplary embodiment, flue gas from the regeneration of the partially regenerated spent cracking catalyst along with the third oxygen and carbon dioxide atmosphere, have a water content ranging from about 1 to about 10 mole percent.

In a preferred embodiment, the third oxygen and carbon dioxide atmosphere, or strictly the carbon dioxide portion of the atmosphere, may be preheated in a furnace 672 prior to combining with the oxygen and the spent cracking catalyst. Similar to the furnaces 650, 670, the furnace 672 may preheat the third oxygen and carbon dioxide atmosphere, or strictly the carbon dioxide portion of the atmosphere, to a temperature substantially equal to the operating temperature of the third regeneration zone 500. Those skilled in the art will also realize that the preheating of the third oxygen and carbon dioxide atmosphere, or strictly the carbon dioxide portion of the atmosphere, may also be accomplished by heat exchange with a hot process stream. The hot process stream, in an exemplary embodiment, could include the first regeneration zone flue gas line 340 or the second regeneration zone flue gas line 440. The components of the third oxygen and carbon dioxide atmosphere are shown in FIG. 1 as flowing into a common line prior to entering the lower portion of the third regenerator dilute phase transport line 530, however the skilled artisan will understand that any one or a portion of these flows may be introduced separately or in combination. It is within the scope of this disclosed invention that the carbon dioxide rich flue gas by-product from the third regeneration zone may be in whole or in part directed to any one, or any combination, of the first, second or third oxygen and carbon dioxide atmospheres. Most likely this would be provided in its hot state and compressed.

The flow rate of each component of the third oxygen and carbon dioxide atmosphere introduced to the third regeneration zone 500 may vary, however, the flow rate of each component should be adjusted independently so as to oxidize the remaining portion of the remaining net coke production while generating just enough carbon dioxide to fuel the first, second, and third oxygen and carbon dioxide atmospheres.

In one advantageous embodiment, the third regeneration zone 500 temperature is somewhat similar to the second regeneration zone 400 temperature. For example, the third regeneration zone 500 temperature should also be greater than the 1400° F. used in the first regeneration zone 300. In an exemplary embodiment, the third regeneration zone 500 temperature may range from about 1500° F. to about 1800° F. Since the water forming hydrogen content of the coke was substantially reduced in the first and second regeneration zones 300, 400, the partially regenerated spent cracking catalyst can handle temperatures up to about 1800° F. without damage.

The partially regenerated spent cracking catalyst and the third oxygen and carbon dioxide atmosphere flow upwardly within the third regenerator dilute phase transport line 530 to the third disengaging space 510 for separation of the remaining portion of the remaining coke from the partially regenerated spent catalyst. Partially regenerated catalyst flowing from the upper portion of the third regenerator dilute phase transport line 530 tends to fall into the lower portion of the third disengaging space 510 to form a fluid bed. While located within the fluid bed, additional oxidation of the coke from the partially regenerated catalyst may occur. To facilitate the additional oxidation within the fluid bed, in an exemplary embodiment, additional oxygen and carbon dioxide may be introduced within the fluid bed. For example, the additional carbon dioxide and oxygen atmosphere may be introduced within the fluid bed at a point below a distribution grid or piping coil.

The vaporous reactants of the third regeneration zone 500 tend to rise within the third disengaging space 510 and enter the cyclones 550. The cyclones 550, similar to the cyclones 250, 350, 450, may separate suspended spent catalyst from the vaporous flue gas. Spent catalyst removed from the vaporous flue gas may then flow downwardly through the dip leg to the fluid bed, as the vaporous flue gas exits the third regeneration zone 500 through the third regeneration flue gas line 540. The vaporous flue gas may then enter the third regeneration zone treating or separation system 560. The vaporous flue gas may be given treatment or separation utilizing any one or more of several types of well-known treatments or separations. Such treatments may separate the vaporous flue gas into its constituent components.

In contrast to the second regeneration zone 400 where larger amounts of carbon monoxide are formed, the third regeneration zone 500 produces larger amounts of carbon dioxide. Namely, one of the purposes of the third regeneration zone 500 is to restore the full potential activity to the cracking catalyst prior to returning the cracking catalyst to the cracking reaction zone 200, and supply the carbon dioxide required to feed the first, second and third oxygen and carbon dioxide atmospheres. Other minor constituents produced by the treatment of the vaporous flue gas include water, sulfur compounds, nitrogen compounds, carbon monoxide and particulate matter.

In situations where the amount of carbon dioxide produced in the third regeneration zone 500 is not sufficient to provide the needed carbon dioxide for the first, second and third oxygen and carbon dioxide atmospheres, supplemental fuel 675 may be included with the first, second or third oxygen and carbon dioxide atmospheres, or added separately. Although the supplemental fuel 675 may be added to the first, second or the third regeneration zones 300, 400, 500, it is preferred to add it to the first regeneration zone so as to reduce the hydrogen content, if any, of such fuel 675 components before the carbon content thereof flows to the second or third regeneration zone 400, 500, operated at temperatures at which the catalyst may be damaged by water content. Inclusion of the supplemental fuel 675 can be tailored to help increase the output of the carbon dioxide in this third regeneration zone 500. For instance, a specified amount of a carbon-based material highly deficient in hydrogen could be supplemented with the first, second or third oxygen and carbon dioxide atmospheres, or added separately. Such carbon-based materials may include carbon derived from coal, pitch, and many others. Furthermore, it is preferred to use a high carbon-based material having low concentrations of hydrogen, ash, and sulfur.

As is illustrated, a remaining portion of the substantially regenerated catalyst may then flow through the third regenerated catalyst transport line 520 to the lower portion of the dilute phase cracking reactor transport line 230. The substantially regenerated catalyst then recombines with the feedstock as previously mentioned, and the process repeats itself. In an exemplary embodiment, located in the third regenerated catalyst transport line 520, between the third regeneration zone 500 and the catalyst cracking reaction zone 200, may be a heat exchanger 690. The heat exchanger 690 in a preferred embodiment cools the temperature of the regenerated catalyst to a desired temperature, and attempts to adjust the catalyst to oil weight ratio (C/O) for increased cracking selectivity. This temperature may range from about 1150° F. to about 1500° F. In FIG. 1, the preheaters 620, 650, 670 and 672 are shown as fired heaters, but those skilled in the art will realize that the preheating may be at least in part accomplished by heat exchange such as, but not limited to, exchanger 690, without changing the teaching of this disclosed invention.

The above mentioned inventive method of producing a synthesis gas from regeneration of a spent cracking catalyst has many monetary and environmental benefits associated therewith. Of particular importance is the ability of the current inventive method to convert the vaporous flue gas, which was historically considered waste, into usable and non-environmentally objectionable material. Historically, the vaporous flue gas was passed through a waste heat boiler, treated, for example for reduction of sulfur compounds or particulate matter, and released into the atmosphere, all the while raising environmental concerns. However, since the current process is capable of producing commercial amounts of synthesis gas, and that synthesis gas is captured, the amount of particulate matter (PM), sulfur oxide ($SO_x$), nitrogen oxide ($NO_x$) and volatile organic compounds (VOC) released into the atmosphere by the second or third regeneration zones 400, 500, is substantially reduced. Moreover, not only are these emissions reduced, but they are reduced by purification of product synthesis gas.

Of equal importance is the tailoring of the third regeneration zone 500 to provide just enough carbon dioxide to operate the first, second and third regeneration zones 300, 400, 500. In essence, the catalytic cracker 100 is designed to burn just the right amount of carbon off of the spent cracking catalyst in the second regeneration zone 400 to produce the most carbon monoxide possible and still have the ability to provide the needed carbon dioxide from the third regeneration zone 500.

Another environmental and monetary benefit resulting from the inventive method of producing a synthesis gas from regeneration of a spent cracking catalyst, resides in the ability of the catalytic cracker 100 to accept heavier feedstock (long residuum), i.e., feedstocks containing high amounts of asphalt, pitch and other high coke forming constituents, without the need to hydrotreat, distill, or extract such feedstocks prior to catalytic cracking. In substance, the second or third regeneration zones 400, 500, allow a much heavier feedstock to be accepted than if the catalytic cracker contained only one or two regeneration zones. However, this is not to say that the hydrotreatment may not still be profitable. Currently, the quality of the crude oil derived feedstock has decreased in recent years, and unless one is willing to pay a very high premium to get very high quality feedstock, heavy feedstock was the only option. However, as a result of the above-mentioned process, the use of heavy feedstock is now a plausible option.

Historically, using the heavy feedstock required distilling, extracting, or hydrotreating of the long residuum, asphalt, pitch and other components of high coke forming characteristic feedstock, prior to catalytically cracking such a feedstock. However, since the distillation process may be dispensed with for many crude oil sources, environmental and storage concerns associated with the removal of the asphalt, pitch and other high coke forming constituents are substantially reduced. Likewise, any emissions into the atmosphere resulting from the hydrotreating, distillation or extraction processes are substantially reduced. Therefore, the ability to accept raw heavy feedstock is both environmentally and momentarily beneficial.

Some reduction in the emissions from sources other than the catalytic cracker may also be realized. Such possible sources may include, in addition to hydrotreatment, distillation, and extraction processing equipment, the alternate conversion equipment, such as but not limited to, coker processing equipment. Because the amount of long residuum which is processed in such sources is substantially reduced or eliminated, the emissions of such sources would be reduced accordingly. Emissions such as fugitive emissions are generally unaffected unless the total operation is discontinued.

Another benefit realized by the inventive method, and more specifically the higher production rate of synthesis gas, is that only about 28% of the heat evolved in complete combustion mode of regeneration is experienced in forming carbon monoxide in the catalyst regenerators. The lower heat output plays an important factor in maintaining the catalytic cracking system in thermal equilibrium, while continuing to remove enough of the coke from the catalyst to sustain the cracking process.

Although the present invention has been described in detail, those skilled in the art should understand that they can make various changes, substitutions and alterations herein without departing from the spirit and scope of the invention in its broadest form. For example, those skilled in the art will understand that there are almost limitless ways that the process of FIG. 1 can be modified without departing from the teachings of the herein described invention.

What is claimed is:

1. A method of producing a synthesis gas product from a regeneration of spent cracking catalyst, comprising:

introducing a spent cracking catalyst into a first regeneration zone in a presence of a first oxygen and carbon dioxide atmosphere, wherein said first regeneration zone is operated at a temperature ranging from about 1150° F. to about 1400° F. so as to reduce cracking catalyst damage resulting from high temperature regeneration with a high moisture content atmosphere, and so as to oxidize a greater proportion of a hydrogen content than carbon content of coke associated with said spent cracking catalyst, thereby substantially reducing a water content of a subsequent regeneration zone, and wherein said carbon dioxide of said first oxygen and carbon dioxide atmosphere is a diluent for said oxygen of said first oxygen and carbon dioxide atmosphere;

introducing said spent cracking catalyst from said first regeneration zone into a second regeneration zone in a presence of a second oxygen and carbon dioxide atmosphere, wherein said second regeneration zone is operated at a temperature ranging from about 1500° F. to about 1800° F. and maintained in a partial oxidation mode, said second regeneration zone temperature and partial oxidation mode of operation resulting in a substantial portion of said carbon dioxide of said second oxygen and carbon dioxide atmosphere to function as a reactant with carbon remaining associated with said spent cracking catalyst to form two moles of carbon monoxide per mole of carbon dioxide reacted, and thus result in a synthesis gas product rich in carbon monoxide; and introducing said spent cracking catalyst from said second regeneration zone into a third regeneration zone in a presence of a third oxygen and carbon dioxide atmosphere, wherein said third regeneration zone is operated at a temperature of greater than about 1400° F. and maintained in an oxidation mode to produce a flue gas by-product rich in carbon dioxide.

2. The method as recited in claim 1 wherein said second regeneration zone is operated such that just enough carbon remains associated with said spent cracking catalyst exiting said second regeneration zone to provide enough carbon dioxide for said first, second, or third regeneration zone.

3. The method as recited in claim 2 wherein said first, second or third regeneration zones completely use all said carbon dioxide produced in said third regeneration zone.

4. The method as recited in claim 1 wherein said third regeneration zone is operated with a slight excess of oxygen, which ensures that substantially all said carbon is burned from said spent cracking catalyst and that a majority of said resulting flue gas is carbon dioxide.

5. The method as recited in claim 1 wherein said carbon dioxide of said second oxygen and carbon dioxide atmosphere also functions as a diluent for said oxygen of said second oxygen and carbon dioxide atmosphere.

6. The method as recited in claim 1 wherein a supplemental fuel is added to said first, second or third regeneration zone.

7. The method as recited in claim 6 wherein said supplemental fuel is a hydrocarbonaceous material.

8. The method as recited in claim 1 wherein at least a portion of said first oxygen and carbon dioxide atmosphere is preheated to a temperature substantially equal to said first regeneration zone temperature.

9. The method as recited in claim 1 wherein at least a portion of said second or third oxygen and carbon dioxide atmosphere is preheated to a temperature substantially equal to said second or third regeneration zone temperature, respectively.

10. The method as recited in claim 1 wherein introducing a spent cracking catalyst into a first regeneration zone includes forming a carbon dioxide by-product.

11. The method as recited in claim 10 wherein said carbon dioxide by-product forms a part of said first, second or third oxygen and carbon dioxide atmosphere.

12. The method as recited in claim 1 wherein said second or third oxygen and carbon dioxide atmosphere is substantially water-free.

13. The method as recited in claim 12 wherein said second or third oxygen and carbon dioxide atmosphere has a water content ranging from about 1 to about 10 mole percent.

14. A catalytic cracking process, comprising:

introducing a feedstock and a catalyst into a catalytic cracker reaction zone;

cracking said feedstock into a cracked product and a spent cracking catalyst;

regenerating said spent cracking catalyst obtained from said catalytic cracker reaction zone, including;

introducing a spent cracking catalyst into a first regeneration zone in a presence of a first oxygen and carbon dioxide atmosphere, wherein said first regeneration zone is operated at a temperature ranging from about 1150° F. to about 1400° F. so as to reduce cracking catalyst damage resulting from high temperature regeneration with a high moisture content atmosphere, and so as to oxidize a greater proportion of a hydrogen content than carbon content of coke associated with said spent cracking catalyst, thereby substantially reducing a water content of a subsequent regeneration zone, and wherein said carbon dioxide of said first oxygen and carbon dioxide atmosphere is a diluent for said oxygen of said first oxygen and carbon dioxide atmosphere;

introducing said spent cracking catalyst from said first regeneration zone into a second regeneration zone in a presence of a second oxygen and carbon dioxide atmosphere, wherein said second regeneration zone is operated at a temperature ranging from about 1500° F. to about 1800° F. and maintained in a partial oxidation mode, said second regeneration zone temperature and partial oxidation mode of operation resulting in a substantial portion of said carbon dioxide of said second oxygen and carbon dioxide atmosphere to function as a reactant with carbon remaining associated with said spent cracking catalyst, to form two moles of carbon monoxide per mole of carbon dioxide reacted, and thus result in a synthesis gas product rich in carbon monoxide; and introducing said spent cracking catalyst from said second regeneration zone into a third regeneration zone in a presence of a third oxygen and carbon dioxide atmosphere, wherein said third regeneration zone is operated at a temperature of greater than about 1400° F. and maintained in an oxidation mode to produce a flue gas by-product rich in carbon dioxide; and recycling a regenerated catalyst from said third regeneration zone to said catalytic cracker reaction zone.

15. The process as recited in claim 14 wherein introducing a feedstock includes introducing an unseparated feedstock.

16. The process as recited in claim 15 wherein introducing an unseparated feedstock includes introducing an unseparated feedstock containing asphalt or pitch.

17. The process as recited in claim 14 wherein said second regeneration zone is operated such that just enough carbon remains associated with said spent cracking catalyst exiting said second regeneration zone to provide enough carbon dioxide for said first, second, or third regeneration zone.

18. The process as recited in claim 14 wherein said first, second or third regeneration zones completely use all said carbon dioxide produced in said third regeneration zone.

19. The process as recited in claim 14 wherein said third regeneration zone is operated with a slight excess of oxygen, which ensures that substantially all said carbon is burned from said spent cracking catalyst and that said majority of said resulting flue gas is carbon dioxide.

20. The process as recited in claim 14 wherein said carbon dioxide of said second oxygen and carbon dioxide atmosphere also functions as a diluent for said oxygen of said second oxygen and carbon dioxide atmosphere.

21. The process as recited in claim 14 wherein a supplemental fuel is added to said first, second or third regeneration zone.

22. The process as recited in claim 21 wherein said supplemental fuel is a hydrocarbonaceous material.

23. The process as recited in claim 14 wherein at least a portion of said first oxygen and carbon dioxide atmosphere is preheated to a temperature substantially equal to said first regeneration zone temperature.

24. The process as recited in claim 14 wherein at least a portion of said second or third oxygen and carbon dioxide atmosphere is preheated to a temperature substantially equal to said second or third regeneration zone temperature, respectively.

25. The process as recited in claim 14 wherein said second or third oxygen and carbon dioxide atmosphere is substantially water-free.

* * * * *